United States Patent [11] 3,630,697

[72] Inventors Irl N. Duling;
Richard D. Cassar, both of West Chester, Pa.
[21] Appl. No. 840,529
[22] Filed July 9, 1969
[45] Patented Dec. 28, 1971
[73] Assignee Sun Oil Company
Philadelphia, Pa.

[54] WICKLESS CANDLES
2 Claims, No Drawings

[52] U.S. Cl. .................................................. 44/7.5,
431/288
[51] Int. Cl. ...................................................... C10l 5/00
[50] Field of Search ............................................ 44/7.5, 6, 7;
431/288, 125, 126

[56] References Cited
UNITED STATES PATENTS
2,831,330 4/1958 Walker ........................ 44/7.5 X
3,091,952 6/1963 Black .......................... 44/7.5 X
3,232,720 2/1966 Kepple ........................ 44/6 X

*Primary Examiner*—Daniel E. Wyman
*Assistant Examiner*—C. F. Dees
*Attorneys*—George L. Church, Donald R. Johnson and Wilmer E. McCorquodale, Jr.

ABSTRACT: A wickless candle can be formed from a composition comprising 45 to 97.9 weight percent wax, 1 to 30 weight percent stearic acid and 1.1 to 25 weight percent ultrahigh molecular weight polyethylene. The wickless candle is easily ignitable, burns with little or no dripping and leaves little residue upon complete combustion. The wax can be a paraffin wax or a combination of paraffin wax and one or more of the following waxes: candellilla, carnauba, montan, spermaceti and beeswax. The ultrahigh molecular weight polyethylene refers to a polyethylene with a weight average molecular weight in the range of 500,000 to 6,000,000. The components of the composition are uniformly distributed therein.

WICKLESS CANDLES

BACKGROUND OF THE INVENTION

The invention relates to a novel candle formulation whereby no wick is required. It especially relates to a candle formulation comprising paraffin wax, which may contain other components normally used in candle formulation, and additionally containing polyethylene with a weight average molecular weight in the range of 500,000 to 6,000,000. The addition of the latter to the candle formulation permits the manufacture of a candle without a wick. The aforementioned polyethylene is also referred to as ultrahigh molecular weight polyethylene or "UHMW PE." The invention also embraces a wickless candle as an article of manufacture.

Much of the effort in improving candle performance has been directed towards improvements in the performance of the wick. In Kirk and Othmer, *Encyclopedia of Chemical Technology*, Second Edition, Volume 4, under "Candles" is a detailed description of the complex art involved in preparing a satisfactory wick. Briefly, selected cotton yarn of certain physical properties is interwoven or plaited into a wick. This plaited wick is boiled in a weak alkali solution, bleached with chlorine or chlorine-containing solution with hydrochloric acid and washed with clean water. Excess water is removed. A specially prepared chemical solution is applied to the wick. After the water is removed the salts remaining improve the burning characteristics of the wick and when the flame is extinguished prevents afterglow and smoldering. After soaking or boiling in the aqueous chemical solution, the composition of which varies greatly, depending upon the manufacturer, the wick is removed, dried and inspected. The wick is then wound on spools for use.

Consequently, a candle which performs satisfactorily but does not require a costly and difficult-to-make wick is highly desirable.

SUMMARY OF THE INVENTION

The addition of 1.1 to 25 weight percent of the composition of UHMW PE to candle formulations permits the manufacture of wickless candles. The elimination of the wick does not adversely affect the candle's performance. On the contrary a candle prepared using the improved formulation of this invention performs highly satisfactorily. In addition to the UHMW PE the formulation comprises: 45 to 97.9 weight percent paraffin wax or a combination of paraffin wax and one or more of the following waxes: candellilla, carnauba, montan, spermaceti and beeswax; and 1 to 30 weight percent stearic acid.

DESCRIPTION

The most common materials used as the major component in candles are the waxes. Specifically, various grades of paraffin waxes having melting points above 100° F. can be used. For example, a suitable paraffin wax can have a melt point between 127° F. and 156° F. (AMP); a penetration at 77° F. of from 9 to 33 (ASTM D-1321) and a Saybolt Universal viscosity at 210° F. of 37.2 to 44.8 seconds. Other suitable waxes include candellilla wax, carnauba wax, montan wax, spermaceti wax and beeswax. Combinations of waxes are sometimes used, one candle formulation reported in the literature contains 48 percent paraffin wax and 52 percent beeswax.

In addition to the above-described waxes a candle formulation can contain stearic acid. The stearic acid is added for the purpose of hardening the candle composition, raising the bending point, and lowering the melting point. Candle formulations can contain as much as 30 weight percent stearic acid or as little as 1.0 weight percent. One candle formulation reported in the literature contains 70 percent paraffin wax, 10 percent beeswax and 20 percent stearic acid.

In addition to the above-described waxes and stearic acid candle formulations useful for the present purpose can contain a suitable amount of other additives such as antioxidants plus any other components normally used by those skilled in the art in formulating candle wax compositions. The latter category includes such components as reodorants, dyes and nonwaxlike materials which produce a particular burning effect, i.e., chemicals, etc. For example, a candle formulation can contain from 0.001 percent to 0.002 percent ditertiary butyl-p-cresol as an oxidation inhibitor, and/or about 0.1 weight percent of chinoline yellow as a dye.

The preparation of a candle using the formulation defined herein can be by most of the means known to the art; the exceptions being those means which actually require a wick to build up a candle. An example of the latter is the dipping process wherein a wick is repeatedly dipped into a molten candle composition to build up the candle.

Polyethylenes are available with a wide range of molecular weights. These molecular weights have a substantial effect on the properties of the polyethylene. For example a polyethylene with a molecular weight of 1,500 is a waxy solid while a polyethylene with a molecular weight of 1,500,000 is a hard, extremely tough solid. As discussed herein molecular weight refers to weight average molecular weight determined by light scattering or solution viscosity or melt viscosity.

In the synthesis of polyethylene, not all the molecules grow to the same size. The actual size variation depends upon the polymerization employed. Consequently, while the molecular weight of the UHMW PE referred to in the examples herein is stated as being 1,500,000, there are in fact individual molecules in the UHMW PE with molecular weights lower than 1,500,000 and even lower than 1,000,000. Sometimes, the individual molecules have molecular weights as low as 500,000. Also in the same 1,500,000 weight average molecular weight polyethylene there are in fact individual molecules with molecular weights greater than 2,000,000, sometimes the individual molecules have molecular weights as high as 3,000,000 or even as high as 6,000,000. Thus the polyethylene used in this invention can have a weight average molecular weight in the range of 500,000 to 6,000,000.

Surprisingly the addition of an UHMW PE to candle formulations permits the manufacture of wickless candles that are easily ignitable despite the lack of a wick. By easily ignitable it is meant that a safety match, in a windless environment, will ignite the candle. Also once the candle is lit it continues to burn satisfactorily despite the lack of a wick. The wickless candle is essentially drip free. Drip or dripping is the obvious formation of molten material which flows over the periphery of the candle and which solidifies slowly as it falls down the side of the unit. Furthermore despite the lack of the wick the amount of unconsumed material after complete combustion is extremely small.

The unexpected benefits of the present invention are dependent on the amount of UHMW PE used in admixture with the candle formulation. If 5 weight percent of UHMW PE is admix with a candle formulation a wickless candle prepared from the novel formulation can be easily ignited with a safety match whereas a wickless candle prepared from the same candle formulation but without UHMW PE cannot be ignited. However, as the percent of UHMW PE admix with the formulation is increased the ignition characteristics of the formulation approaches that of only UHMW PE which is extremely difficult to ignite with a match. On the other hand as the amount of UHMW PE in the candle formulation decreases, some lower concentration is reached where the amount of UHMW PE is not sufficient to cause any changes in the ignition characteristics of the candle formulation. Therefore it is desirable that the amount of UHMW PE in the candle formulation be less than 50 weight percent, preferably considerably less, and amounts even less than 5 weight percent are operative. As a general rule, the amount of UHMW PE present in the candle formulation should be in the range of 1.1 to 25 weight percent and sufficient to facilitate ignitability of the composition.

The relative volatilities and viscosities of the components of the candle formulation and UHMW PE may help explain why a candle formulation containing 5 weight percent ignites whereas a candle formulation containing too low an amount of UHMW PE will not ignite. When an attempt is made to ignite a candle comprising paraffin wax and stearic acid with a match, the molten wax and molten acid, because they are not very viscous, flow rapidly away from the flame. Because both of the molten materials flow so fast, not enough material vaporizes to start a flame and without sufficient vaporization no flame can be obtained. Thus a relatively low concentration of UHMW PE in the candle formulation does not significantly alter the phenomenon just described. However 5 weight percent UHMW PE does alter the just-described phenomenon. In other words, when an attempt is made to ignite a candle comprising paraffin wax, stearic acid and 5 weight percent UHMW PE with a match, the molten combination of wax, acid and UHMW PE is very viscous and thus flows away slowly from the flame. Because the melted components flow so slowly, enough wax and/or acid material is vaporized by the flame to start and maintain a flame. Once the flame is sustained by vaporizing wax and/or acid molecules the UHMW PE vaporizes, or decomposed portions of UHMW PE vaporize, thus contributing to the flame and the UHMW PE too is consumed.

In order that the heretoforementioned viscosity-volatility interplay exist during combustion the UHMW PE must be uniformly distributed throughout the candle. One way of achieving this uniform distribution is to add the UHMW PE as a fine powder to agitated molten candle formulation, maintained at a temperature below the melting point of the UHMW PE and then allow the combination to solidify while being agitated. A preferred way of achieving this uniform distribution of UHMW PE in the formulation is as follows. UHMW PE powder is added rapidly to the agitated molten formulation maintained at a temperature above the melting point of the UHMW PE and the latter becomes uniformly distributed therein probably in a state of molecular dispersion. As soon as the polyethylene gels the formulation, the homogeneous mass is allowed to cool without agitation. In the solid mass the polyethylene molecules are apparently uniformly distributed throughout the wax and by having a sufficient number of molecules present the molecules are connected together in a random fashion. This molecular connection occurs with 5 weight percent of polyethylene, 75 weight percent wax and 20 weight percent stearic acid but does not occur if the percent polyethylene is too low. The connecting together of the UHMW PE molecules results in a sort of molecular polyethylene sponge in which the voids are filled with wax and acid.

EXAMPLES

A typical paraffin wax, used herein for illustrative purposes, has a melting point of 127° F. (AMP), a viscosity at 210° F. of 43.6 SUS, a penetration at 77° F. of 33 (ASTM D-1321), and an oil content of 0.5 percent (ASTM D-721). AMP refers to the American Melting Point which is an arbitrary figure 3° F. higher than the ASTM melting point. A typical UHMW PE, used herein for illustrative purposes has a weight average molecular weight of 1,500,000; a specific gravity of 0.94 (ASTM D-792), a crystalline melt point of 275° F. as determined by differential thermal analysis and a nil melt index (ASTM D-1238). A typical stearic acid, used herein for illustrative purposes, has a melting point of 133° F. A lower molecular weight polyethylene, used herein for illustrative purposes, had a molecular weight of about 100,000. A microcrystalline wax also used herein for illustrative purposes had a melting point of 151° F. (ASTM D-127).

The compounding of the paraffin wax, stearic acid and UHMW PE was performed in the following manner. Seventy-five parts of paraffin wax and 20 parts of stearic acid were melted in a suitable container. The temperature of the molten combination was maintained at a few degrees above the melting point of the UHMW PE. While the molten combination was being agitated 5 parts of UHMW PE powder were rapidly added. Soon thereafter the polyethylene gelled the combination. After this gelation the combination, without agitation, was allowed to solidify into a candlelike shape.

For comparative purposes wickless candlelike shapes were prepared from (1) only the heretoforementioned wax; (2) the heretoforementioned wax and various weight percents of UHMW PE; (3) the heretoforementioned wax and stearic acid; (4) the heretoforementioned microcrystalline wax; (5) the heretoforementioned microcrystalline wax and the UHMW PE; and (6) only the UHMW PE.

These wickless candle-shaped bodies were tested as to their ease of ignition. Ease of ignition was determined by whether the prepared wickless candle could be ignited with a safety match in a windless environment. After ignition the burning candles were observed as to the amount of dripping. As shown in the following table a wickless candle comprising 75 weight percent paraffin wax, 20 weight percent stearic acid and 5 weight percent UHMW PE ignited easily and burned with essentially no dripping.

TABLE

| Candle | Candle Formulation | Additive, Weight % | Test Result |
| --- | --- | --- | --- |
| 1 | Paraffin wax | None | Would not ignite |
| 2 | Paraffin wax | UHMW PE, 1.0% | Would not ignite |
| 3 | Paraffin wax | UHMW PE, 2.5% | Easily ignited, burns with essentially no dripping |
| 4 | Paraffin wax, 80 wt. %, and Stearic acid, 20 wt. % | None | Would not ignite |
| 5 | Paraffin wax, 75 wt. %, and Stearic acid, 20 wt. % | UHMW PE, 5% | Easily ignited, burns with essentially no dripping or smoking, very little residue |
| 6 | Paraffin wax | PE*, 5% | Would not ignite |
| 7 | Microcrystalline wax | None | Would not ignite |
| 8 | Microcrystalline wax | UHMW PE, 5% | Ignites, burns with substantial dripping, large residue |
| 9 | None | UHMW PE | Difficult to ignite but will burn |

*Polyethylene with a molecular weight of 100,000

Substantially equivalent results as for the above candle 5 are obtained when (1) other paraffin waxes or mixtures thereof with herein specified nonpetroleum waxes are used and/or (2) other ultrahigh molecular weight polyethylenes are employed.

The invention claimed is:

1. A wickless candle composition comprising wax having uniformly distributed therein stearic acid and polyethylene;
   a. said wax being paraffin wax or a combination of paraffin wax and one or more of the following waxes: candelilla, carnauba, montan, spermaceti and beeswax;
   b. said acid being present in amount between 1 and 30 weight percent of the composition; and
   c. said polyethylene having a weight average molecular weight in the range of 500,000 to 6,000,000 and being present in amount between 1.1 and 25 weight percent of the composition and sufficient to facilitate ignitability.

2. A wickless candle according to claim 1 wherein the paraffin wax has a melting point from 127° F. (AMP) to 156° F. (AMP).

\* \* \* \* \*